United States Patent
Iwamoto et al.

(10) Patent No.: US 6,953,310 B2
(45) Date of Patent: Oct. 11, 2005

(54) CEMENTED CARBIDE BALL END MILL

(75) Inventors: Kenji Iwamoto, Toyama (JP); Yousuke Tsuritani, Nei-gun (JP)

(73) Assignee: Nachi-Fujikoshi Corp., Toyama (JP)

( * ) Notice: Subject to any disclaimer, the term of this patent is extended or adjusted under 35 U.S.C. 154(b) by 189 days.

(21) Appl. No.: 10/409,111

(22) Filed: Apr. 9, 2003

(65) Prior Publication Data

US 2003/0198525 A1 Oct. 23, 2003

(30) Foreign Application Priority Data

Apr. 18, 2002 (JP) ........................................ 2002-115640

(51) Int. Cl.[7] .............................................. B23C 5/10
(52) U.S. Cl. ............................. 407/54; 407/53; 407/61; 407/62; 407/63; 407/119
(58) Field of Search .................... 407/53, 54, 61–3, 407/119; B23C 5/10

(56) References Cited

U.S. PATENT DOCUMENTS

| | | | | |
|---|---|---|---|---|
| 3,409,965 A | * | 11/1968 | Fisher | 407/54 |
| 4,175,896 A | * | 11/1979 | Kishinami et al. | 408/230 |
| 4,712,948 A | * | 12/1987 | Kidani | 407/42 |
| 5,026,227 A | * | 6/1991 | Nishi et al. | |
| 5,188,487 A | * | 2/1993 | Okawa et al. | 407/34 |
| 5,193,943 A | * | 3/1993 | Kim | |
| 5,209,612 A | * | 5/1993 | Kish | 407/54 |
| 5,580,196 A | * | 12/1996 | Thompson | 408/145 |
| 6,082,935 A | * | 7/2000 | Hori | 407/54 |
| 6,648,559 B1 | * | 11/2003 | Lee | 407/42 |
| 6,719,501 B2 | * | 4/2004 | Sekiguchi et al. | 407/63 |
| 2002/0031409 A1 | * | 3/2002 | Sato et al. | 407/53 |
| 2002/0067964 A1 | * | 6/2002 | Sekiguchi et al. | 407/63 |

FOREIGN PATENT DOCUMENTS

| | | |
|---|---|---|
| DE | 43 12 101 A1 | 10/1994 |
| DE | 198 24 212 A1 | 12/1998 |
| JP | 2001-293611 | 10/2001 |

* cited by examiner

*Primary Examiner*—Derris H. Banks
*Assistant Examiner*—Sara Addisu
(74) *Attorney, Agent, or Firm*—Venable LLP; Catherine M. Voorhees

(57) ABSTRACT

A cemented carbide ball end mill comprises a cutting portion with a semi-spherical ball portion at a tip thereof. The cutting edge portion has a cutting edge rake face and a chip evacuating flute at the ball portion. An angle formed by a straight line connecting a vertex of the ball portion, where an intersection line passes through, and another end of the intersection line with respect to the central axis, is from 30° to 50°. Further, and angle formed by the rake face and the chip evacuating flute is from 100° to 150°, and a width of the chip evacuating flute is 0.5 to 5 times as large as a radius of the ball portion.

4 Claims, 4 Drawing Sheets

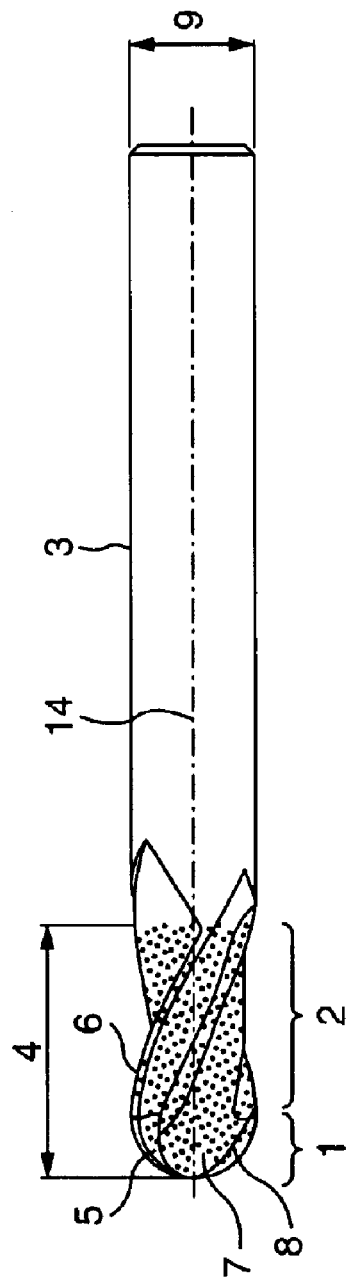
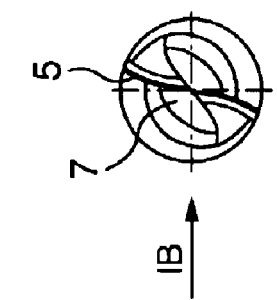

FIG.5A
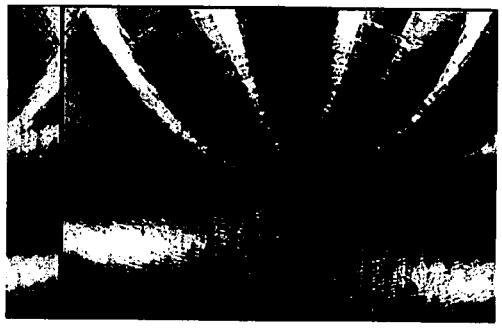
FIG.5B
FIG.6
| ORDER OF MACHINED SURFACE QUALITY | TOOL | METHOD OF MACHINING | NOTES |
|---|---|---|---|
| 1 | TOOL OF INVENTION | SEMI-DRY | |
| 2 | TOOL OF INVENTION | WET | |
| 3 | CONVENTIONAL TOOL | SEMI-DRY | |
| 4 | TOOL OF INVENTION | DRY | |
| 5 | CONVENTIONAL TOOL | WET | |
| 6 | CONVENTIONAL TOOL | DRY | MACHINING IS IMPOSSIBLE |

CEMENTED CARBIDE BALL END MILL

BACKGROUND OF THE INVENTION

This invention generally relates to a cemented carbide ball end mill for machining an aluminum alloy, and more particularly to an improvement in the configuration of and in a coating film for a cemented carbide ball end mill capable of performing dry machining.

Hitherto, when machining an aluminum alloy with a cemented carbide ball end mill, in order to prevent the melted aluminum alloy from being deposited on the machine tool, the aluminum alloy has usually been machined while applying water-soluble cutting fluid for promoting lubricating action. In recent years, however, because of a corrosive property of the water-soluble cutting fluid or a difficulty in handling of the cutting fluid as industrial waste, demand for machining an aluminum alloy by a cemented carbide ball end mill without using the cutting fluid, or needs for so-called dry machining have been rising.

A problem posed when machining an aluminum alloy with a cemented carbide ball end mill is the deposition of the melted aluminum alloy to cutting edges of the machine tool. Conventional cemented carbide ball end mill tools suffer a considerable deposition of melted aluminum alloy during dry machining, and once the deposition occurs, flutes of the cutting edges are instantly filled up with the cut material. When still the machining is forcibly continued, there are cases where the machined face will be extremely deteriorated and, at the worst, the tool will be broken and become incapable of cutting. Meanwhile, in the cemented carbide end mill of a square type, as disclosed in JP-A-2001-293611, the dry machining of an aluminum alloy is realized by applying the coating film having a small coefficient of dynamic friction and improving the deposition resistance.

BRIEF SUMMARY OF THE INVENTION

However, in the conventional ball end mill of the configuration shown in FIGS. 4A and 4B, the space of each chip evacuating flute 7 of at a ball portion is narrow. This causes a problem that even when a coating film similar to that described above is applied to the ball end mill, chip packing or clogging occurs at the tip of the ball portion and the end mill falls into a state incapable of cutting.

In view of the above problems of the conventional art, it is an object of the present invention to provide a cemented carbide ball end mill which suffers less deposition even when machining an aluminum alloy in a dry state, has a long service life, and enables the machining providing an excellent surface quality or property.

The inventors have found from their research that, in the ball end mill used for cutting a soft nonferrous metal material such as an aluminum alloy, the deposition is reduced or eliminated by widening chip evacuating flutes of a ball portion. However, the widening of the chip evacuating flutes arouses a feat that the tool rigidity will be reduced. With regard to this issue, the inventors have noticed that cutting resistance during the machining of a nonferrous metal such as an aluminum alloy is smaller than that in the case of a ferrous material. And, the inventors have found that an ideal cemented carbide ball end mill for machining aluminum can be obtained by providing the ball end mill with a configuration, dimensions, and others for ensuring the required rigidity and strength to the soft nonferrous material such as an aluminum alloy.

A cemented carbide ball end mill of the invention according to claim 1 has a cutting portion which comprises a semi-spherical ball portion, at least one cutting edge formed along the outer periphery of the end mill including the ball portion, and a chip evacuating flute adjacent to the cutting edge. The cemented carbide ball end mill, based on the above-described finding, has the following configuration. When an intersection line between the rake face of the cutting edge and the chip evacuating flute at the ball portion is projected on a plane that includes the central axis of the cemented carbide ball end mill and is parallel with the cutting edge at the central portion of the tip of the ball portion, projected on the plane is a convex-curved line or a straight line. An angle formed by the straight line connecting the vertex of the ball portion, where the intersected line passes through, and the other end of the intersection line with respect to the central axis is from 30° to 50°. Further, in a plane perpendicular to the intersection line, an angle formed by the rake face of the cutting edge and a straight line portion at the bottom of the chip evacuating flute falls in a range of 100° to 150°. In the perpendicular plane, a width of the bottom straight line portion of the chip evacuating flute with respect to the perpendicular plane is 0.5 to 5 times as large as the radius of the ball portion.

In more detail, the intersection line between the rake face of the cutting edge and the chip evacuating flute on the projection plane is set to be the convex-curved line or the straight line. Further, when the angle formed by the straight line connecting the vertex of the ball portion, where the intersection line passes through, and the other end of the intersection line with respect to the central axis of the ball end mill is less than 30°, the rigidity of the cutting edge is exceedingly insufficient, and when the angle is over 50°, chips are difficult to be evacuated. Thus, the angle is set at 30° to 50°. Furthermore, in the plane perpendicular to the intersection line, when the angle formed by the rake face of the cutting edge and the chip evacuating flute is less than 100°, the bottom of the chip evacuating flute becomes too steep relative to the rake face, chips are difficult to be moved, an when the angle exceeds 150°, the strength of the cutting edge is reduced. Consequently, the angle is set to fall in the range of 100° to 150°. When the width of the bottom portion of the chip evacuating flute with respect to the perpendicular plane is less than 0.5 times of the radius of the ball portion, the chip evacuating flute is exceedingly small, and when the width exceeds 5 times, the overall strength is weakened. Therefore, the width of the bottom straight line portion of the chip evacuating flute with respect to the perpendicular plane is set to be 0.5 to 5 times as large as the radius of the ball portion.

With this construction, the cemented carbide ball end mill of the invention is provided with the wide chip evacuating flute to have the excellent chip evacuating performance and the sufficient rigidity of the cutting edge, thereby improving the machining performance for semi-dry and wet machining of an aluminum alloy.

Further, as claimed in claim 2, the cutting portion of the cemented carbide ball end mill may have a coating formed on the surface the cutting portion. The coating includes a first layer coating film of titanium carbide (TiC) or aluminum titanium nitride (TiAlN) and a second layer coating film which is formed on the first layer coating film and comprises a titanium carbide system film (TiC/C) having a physical property similar to that of diamond, a silicon carbide system amorphous film (SiC/C) having a physical property similar to that of diamond, a chromium carbide system film (CrC/C), or a boron carbide system film (BC/C). With this coating, the semi-dry and wet machining capability of the cemented carbide ball end mill is further improved, and moreover the dry machining is enabled.

BRIEF DESCRIPTION OF THE SEVERAL VIEWS OF THE DRAWING

The above-mentioned and other objects, features and advantages of the invention will become apparent from the following description of the embodiment of the invention taken in conjunction with the accompanying drawings, in which:

FIG. 1A is a front view of the cemented carbide ball end mill with two cutting edges according to an embodiment of the invention;

FIG. 1B is a side view of the ball end mill;

FIG. 5A is a view showing the result (machined surface) of a cutting test with the cemented carbide ball end mill of the invention;

FIG. 5B is a view showing the result of a cutting test with the conventional cemented carbide ball end mill; and FIG. 6 is a table of the results of cutting tests with the cemented carbide ball end mill of the invention and the conventional cemented carbide ball end mill, showing the machined surface properties from the machining using cutting fluid, dry machining, and so on in comparison with each other, in which items are arranged in order of excellence in the machined face property.

DETAILED DESCRIPTION OF THE INVENTION

Figure 2:
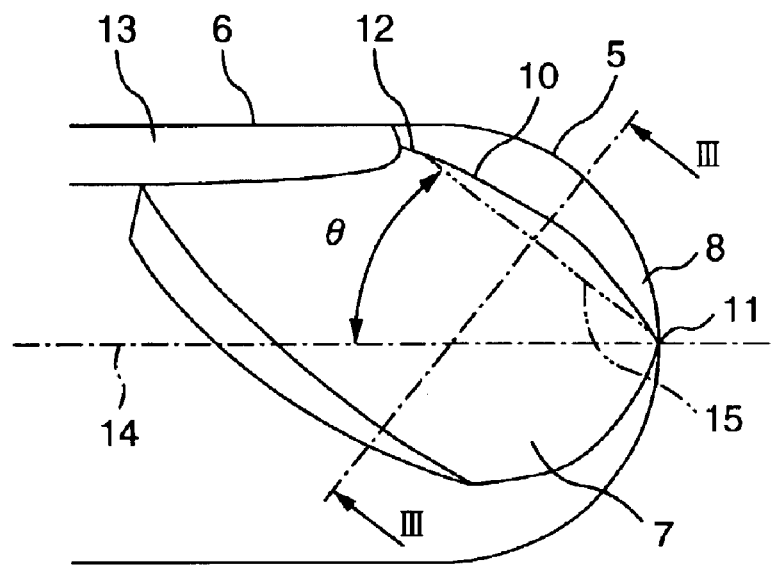
FIG. 2 is a view showing in an enlarged scale the ball portion of the end mill as viewed in the direction of an arrow IB of FIG. 1A.

With reference to the drawings, the cemented carbide ball end mill having two cutting edges according to the embodiment of the present invention will be described. FIG. 1A is a front view of the cemented carbide ball end mill, FIG. 1B is an enlarged side view thereof, and FIG. 2 is a view of the tip portion of the cemented carbide ball end mill as viewed in the direction of an arrow IB shown in FIG. 1.

In FIG. 1B and FIG. 2B, an outer peripheral cutting portion 2 is provided continued to a ball portion 1, and further a bar-shaped shank portion 3 is provided. Cutting edges are formed in the ball portion 1 and the outer peripheral cutting portion 2, and these are cutting edges 5 of the ball portion and cutting edges 6 of the outer peripheral cutting portion. The axial portion provided with the cutting edges forms a cutting portion generally denoted by a reference numeral 4. A chip evacuating flute 7 is formed adjacent to a rake face 8 defining each cutting edge 5.

In the present embodiment, the diameter 9 of the cutting portion is 6 mm, and the ball portion has a radius of 3 mm. An intersection line 10 between the rake face 8 and the adjacent chip evacuating flute 7 at the ball portion is a convex-curved line or a straight line. An end of the curved or straight line passes through vertex 11 of the ball portion (a tip of the ball portion). An angle θ, which is formed by a line 15 connecting the vertex 11 and another end 12 of the intersection line 10 with respect to a central axis 14 of the ball end mill, is in a range of 30° and 50°. A numeral 13 denotes a rake face of the cutting edge 6 of the outer peripheral cuffing portion, and the other end 12 of the intersection line 10 reaches the fringe of the rake face 13 of the outer peripheral cutting edge.

Figure 3:
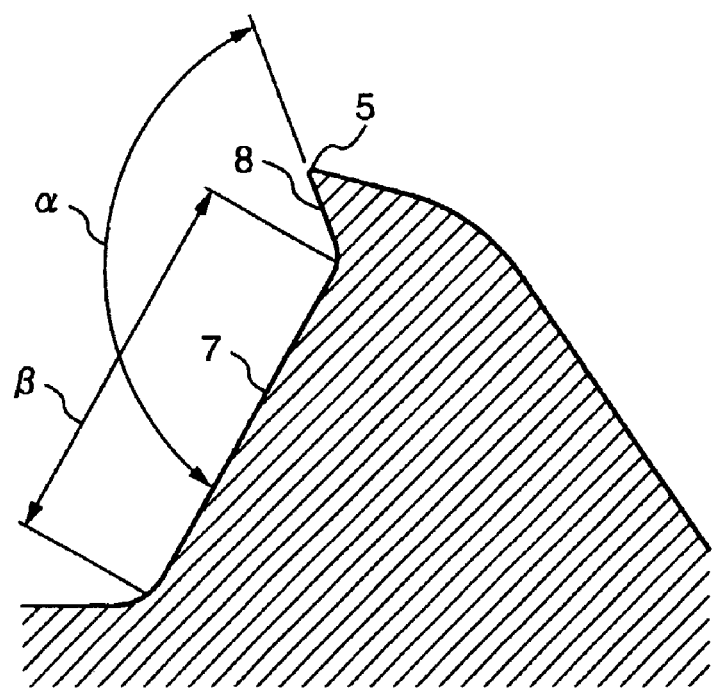
FIG. 3 is a sectional view taken along a line III—III of FIG. 2 and showing a section perpendicular to the intersection between the rake face of a cutting edge and a chip evacuating flute at the ball portion of the cemented carbide ball end mill.

FIG. 3 is a sectional view of the cemented carbide ball end mill taken along a line III—III of FIG. 2, showing a plane perpendicular to the intersection line 10 between the rake face 8 and the chip evacuating flute 7 at the ball portion. An angle α formed by the rake face 8 and the chip evacuating flute 7 at the ball portion 1 falls in a range of 100° to 150°, and a width of a straight line portion of the chip evacuating flute 7 with respect to the perpendicular plane is in a range of 0.5 to 5 times of the ball radius.

The cemented carbide ball end mill according to the embodiment has, as a base material, an ultra fine grain carbide alloy containing WC 94.4%, Co 5%, and others 0.6%. The cutting portion 4 is applied with a coating film in the region shown in FIGS. 1A and 1B with dots to improve the deposition resistance to an aluminum alloy. The coating film is produced by forming a titanium carbide (TiC) or aluminum titanium nitride (TiAlN) coating film as a first layer to ensure the abrasion resistance, and then adding thereon a second layer coating film a silicon carbide system (SiC/C) amorphous film having a physical property similar to that of diamond.

On the other hand, a conventional cemented carbide ball end mill to be compared with the invention has an ultra fine grain carbide alloy containing WC 90%, Co 8.5%, and others 1.5% as a base material. In this conventional ball end mill, coating or the like is not applied on the surface of the cutting edge portion.

Besides, although the coating film is applied in the embodiment, if the deposition of a melted workpiece material to the cutting edges is at an extent causing no practical problem through the use of a cutting fluid for instance, the cemented carbide ball end mill of the invention may of course be used in a state of no treatment or without being applied with the surface treatment.

Figures 4A, 4B:
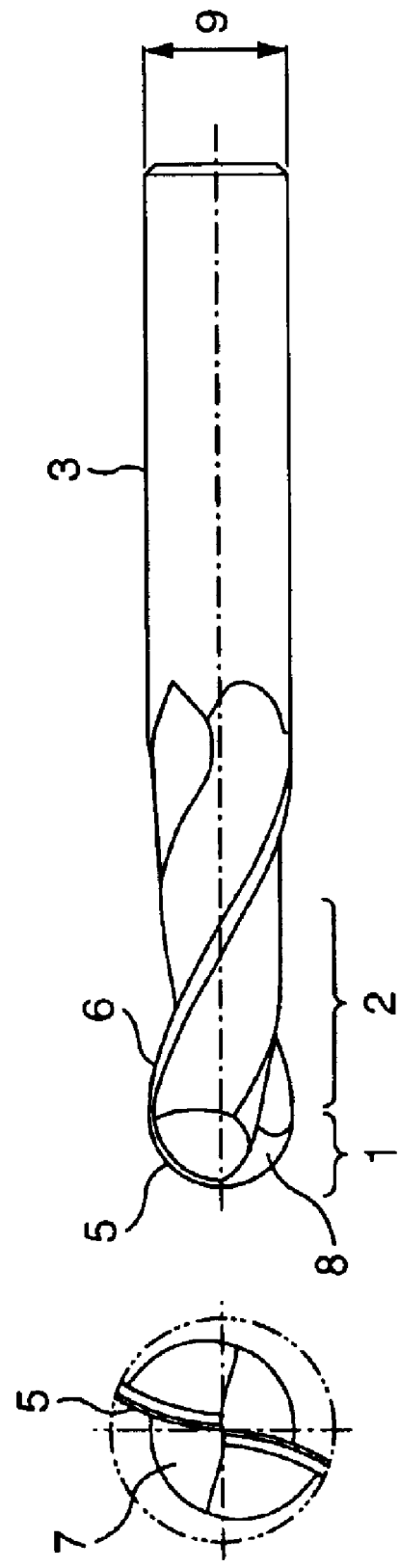
FIG. 4A is a front view of a conventional cemented carbide ball end mill with two cutting edges.
FIG. 4B is a side view of the conventional ball end mill.

A comparison test was made between the cemented carbide ball end mill according to the above-described embodiment of the invention, in which the ball portion has the configuration of widening the chip evacuating flutes and the coating film is formed to improve the abrasion resistance and the deposition resistance, and a conventional cemented carbide, non-treated ball end mill shown in FIGS. 4A and 4B. Meanwhile, in FIGS. 4A and 4B, portions which are similar to those of the above-described embodiment are denoted by the same reference numerals, and the description thereof will be omitted. The comparison test was conducted on the workpiece material of rolled aluminum A 5052 by performing engraving machining (total length 162 mm, total width 12 mm, cutting length 30 m) through dry cutting. In the machining, a cutting speed is 472 m/min (speed of rotation 25,000 min$^{-1}$), a table feeding speed 3,000 mm/min (f=0.06 mm/t), a depth of cut in the axial direction 0.2 mm, and a pick feed 0.2 mm.

The machining results of the comparison test are given in FIGS. 5A and 5B. FIG. 5A shows the machining result by the ball end mill of the invention. According to the ball end mill of the invention, almost no deposition took place on the cutting edges, the machining by the dry cutting was realized, and a smooth and glossy machined surface could be obtained as seen in FIG. 5A. In contrast, FIG. 5B shows the machining result by the conventional tool, packing or clogging of chips occurred on the cutting edges of the ball end mill, and the machining become impossible. The machined surface presented a picked-out or gouged state and was bad.

Next, for wet machining with water soluble coolant and for semi-dry machining while supplying external mist oil, tests were conducted respectively on the ball end mill of the invention and on the conventional ball end mill under the same cutting condition. The results thereof are shown in FIG. 6 in order of excellence in the machined face property. The semi-dry machining performed with the ball end mill of the invention achieved the best result, and the wet machining with the ball end mill of the invention, the semi-dry machining by the conventional ball end mill, and the dry machining by the ball end mill of the invention followed in this order. Even in the case where cutting fluid is used, the machined surface quality provided by the ball end mill of the invention is superior to that by the conventional ball end mill. Further, the dry machining with the ball end mill of the invention can achieve a better, machined surface quality than that by the wet machining with the conventional ball end mill. Meanwhile, no dry machining could be realized at all with the conventional ball end mill.

As having described above, the cemented carbide ball end mill of the invention enlarges the spaces of the chip evacuating flutes at the ball portion as compared with those in the conventional tool, while ensuring the required rigidity for machining aluminum. Further, this cemented carbide ball end mill, by applying the coating film for improving the abrasion resistance and the deposition resistance to the cutting portion, enables the dry machining of an aluminum alloy, which has been impracticable hitherto. The cemented carbide ball end mill suffers less deposition of machined metal on the cutting edges, has a long service life, and enables the machining excellent in the surface quality. Furthermore, the cemented carbide ball end mill can perform machining at a high speed, and as using no cutting fluid, brings about the effects of enabling a reduction of the cost and improving the environmental performance.

It will be understood by those skilled in the art that although the foregoing description has been made on the embodiment of the invention, the invention is not limited solely to this specific form and various changes and modifications may be made in the invention without departing from the spirit of the invention and the scope of the appended claims.

What is claimed is:

1. A cemented carbide ball end mill comprising:
   a cutting portion having a semi-spherical ball portion at a tip thereof, at least one cutting edge formed along an outer periphery of the end mill inclusive of the ball portion, and a chip evacuating flute adjacent to the cutting edge, wherein when an intersection line between a rake face of the cutting edge and a chip evacuating flute at the ball portion is projected on a plane which includes a central axis of the cemented carbide ball end mill and is parallel with the cutting edge at a central portion of a tip of the ball portion, the intersection line projected on the plane is a convex-curved line, an angle formed by a straight line connecting a vertex of the ball portion, where the intersection line passes through, and an other end of the intersection line with respect to the central axis is from 30° to 50°, in a plane perpendicular to the intersection line, an angle formed by the rake face and a straight line portion at bottom of the chip evacuating flute is in a range of 100° to 150°, and in the perpendicular plane, a width of the bottom straight line portion of the chip evacuating flute with respect to the perpendicular plane is 0.5 to 5 fives as large as a radius of the ball portion.

2. A cemented carbide ball end mill according to claim 1, wherein said cutting portion further has a first layer coating film, which is consists essentially of one of titanium carbide and aluminum titanium nitride and is formed on a surface of the cutting portion, and a second layer coating film, which is formed on the first layer coating film and comprises one of a titanium carbide system film having a physical property similar to that of diamond, a silicon carbide system amorphous film having the physical property similar to that of a diamond, a chromium carbide system film, and a boron carbide system file.

3. A cemented carbide ball end mill comprising:
   a cutting portion having a semi-spherical ball portion at a tip thereof, a pair of cutting edges formed along an outer periphery of the end mill inclusive of the ball portion, and a pair of chip evacuating flutes, each flute being adjacent to a respective of the pair of the cutting edges, wherein when an intersection line between a rake face of the cutting edge and a chip evacuating flute at the ball portion is projected on a plane which includes a central axis of the cemented carbide ball end mill and is parallel with the cutting edge at a central portion of a tip of the ball portion, the intersection line projected on the plane is a convex-curved line, an angle formed by a straight line connecting a vertex of the ball portion, where the intersection line passes through, and an other end of the intersection line with respect to the central axis is from 30° to 50°, in a plane perpendicular to the intersection line, an angle formed by the rake face and a straight line portion at bottom of the chip evacuating flute is in a range of 100° to 150°, and in the perpendicular plane, a width of the bottom straight line portion of the chip evacuating flute with respect to the perpendicular plane is 0.5 to 5 fives as large as a radius of the ball portion.

4. A cemented carbide ball end mill according to claim 3, wherein the pair of cutting edges are continuously formed on the outer periphery.

* * * * *